United States Patent [19]

Brown

[11] 4,451,508

[45] May 29, 1984

[54] HARD FACING OF METAL SUBSTRATES USING MATERIAL CONTAINING VC AND IMPROVED FLUX COMPOSITIONS THEREFOR

[75] Inventor: Harry J. Brown, Utica, N.Y.

[73] Assignee: Union Carbide Corporation, Danbury, Conn.

[21] Appl. No.: 393,226

[22] Filed: Jun. 28, 1982

[51] Int. Cl.³ .............................................. B23K 9/00
[52] U.S. Cl. .................................... 427/423; 427/225; 427/37; 219/146.41; 219/145.23; 219/137 WM; 219/146.51; 428/698
[58] Field of Search .............................. 428/698, 469; 219/137 WM; 427/34, 37, 225, 423; 219/145.22, 146.23, 146.51, 146.41

[56] References Cited

U.S. PATENT DOCUMENTS

| | | | |
|---|---|---|---|
| 4,055,742 | 10/1977 | Brown et al. | 219/145 |
| 4,162,392 | 7/1979 | Brown et al. | 219/146.51 |
| 4,163,071 | 7/1979 | Weatherly | 427/34 |
| 4,173,685 | 11/1979 | Weatherly | 427/423 |
| 4,177,324 | 12/1979 | Brown et al. | 428/627 |
| 4,224,382 | 9/1980 | Brown et al. | 428/656 |
| 4,312,894 | 1/1982 | Brown et al. | 219/146.51 |

FOREIGN PATENT DOCUMENTS 1142255 2/1969 United Kingdom .......... 219/146.51

*Primary Examiner*—Sam Silverberg
*Attorney, Agent, or Firm*—John R. Doherty

[57] ABSTRACT

Hard facing of iron and iron base alloy substrates is disclosed using a hard facing material containing vanadium carbide and a flux composition containing nickel boron or calcium silicon. The nickel boron is used in amounts ranging from about 1 to 3% by weight of the mixture while the calcium silicon is used in amounts ranging from about 0.1 to 0.5% by weight of the mixture.

14 Claims, No Drawings

HARD FACING OF METAL SUBSTRATES USING MATERIAL CONTAINING VC AND IMPROVED FLUX COMPOSITIONS THEREFOR

DESCRIPTION

1. Technical Field

The present invention relates to the hard facing of iron base alloy substrates. More particularly, the present invention relates to the hard facing of iron base alloy substrates using a vanadium carbide containing hard facing material and flux composition which significantly improves the wetting properties and fluidity of such hard facing materials.

2. Background Art

Hard facing of substrates, e.g., metal surfaces*, is a common industrial practice, for example, cast particulate tungsten carbide ($W_2C$-WC) or cobalt bonded WC, usually encased in a steel tube, is deposited by hard facing techniques on iron base alloys in making wear resistant cutters, earth moving equipment, and the like. It has been found, however, due possibly to the inherently different physical properties of base metal and tungsten carbide, the hard facing material has a tendency to become unevenly distributed in the molten portion of the substrate and as a result, undesired variations in hardness can occur in the resulting solidified hard faced surfaces.

*The Oxy-Acetylene Handbook 11th Edition, Linde Air Products Division of Union Carbide Corporation, also Welding Handbook Third Edition, American Welding Society and Mechanized Surfacing With Alloy Materials—R. S. Zuchowski and J. H. Neely. ASM Review of Metal Literature 1958.

Also, during the deposition of both cast and cobalt-bonded tungsten carbide on iron and steel substrates, the molten iron in the substrate dissolves some of the tungsten carbide and upon cooling results in the precipitation of the mixed carbides ($(FeW)_6C$ and $Fe_3W_3C$) according to the formula $3WC + 9Fe \rightarrow Fe_3W_3C + 2Fe_3C$, thus resulting in substantial depletion of the deposited tungsten into less wear resistant phase.

In instances where tungsten carbide is employed in hard facing, due to the high density of tungsten carbide, a relatively large weight of tungsten carbide is required for adequate hard facing.

In recent years, there have been developed a number of hard facing materials containing vanadium carbide alone or combined with other metal carbides including tungsten carbide, which materials avoid all or at least some of the aforementioned shortcomings of the cast or bonded tungsten carbides. For example, U.S. Pat. Nos. 4,055,742; 4,162,392; 4,177,324; and 4,224,382 disclose the use of vanadium tungsten carbide in solid solution in granular form for use in hard facing iron base alloy substrates.

Although these vanadium carbide-containing hard facing materials are capable of producing hard facing deposits having a toughness and wear resistance which is at least comparable and, in some instances, superior to deposits made from tungsten carbide, they have not yet reached their full potential commercially. A primary reason for this has been the lack of suitable flux or fluxing compositions which will enhance wetting of the vanadium carbides and impart good fluidity throughout the molten pool. A number of conventional fluxes have been tried heretofore including, for example, ferro boron and high carbon ferrochrome, but unfortunately they have not proven to be entirely satisfactory.

It is accordingly an object of the present invention to provide a hard facing method using a material containing vanadium carbide together with a flux or fluxing composition which significantly improves wetting of the vanadium carbide and imparts good fluidity to the molten pool.

DISCLOSURE OF THE INVENTION

The present invention is directed to an improvement in conventional methods of hard facing substrates which comprises employing as the hard facing material a solid material containing at least one vanadium carbide together with a flux or fluxing composition containing a metal compound selected from the group consisting of nickel boron (NiB) and calcium silicon (CaSi) or mixtures thereof.

Although the aforesaid flux or fluxing composition can be used together with a variety of vanadium carbide-containing hard facing materials known in the art, they find particular advantageous use in conjunction with hard facing materials comprising solid granules consisting essentially of vanadium carbide having from about 10 to 50% by weight tungsten in solid solution (VWC) and optionally, from about 1 to 4% by weight molybdenum also in solid solution. The vanadium carbide may be VC, $V_2C$, $V_4C_3$ or mixtures of such carbides. The preferred hard facing materials containing VWC may also contain a nickel-molybdenum alloy binder in amounts of from 1 to 4% by weight of the granular material.

DETAILED DESCRIPTION

According to a specific embodiment of the invention, the hard facing material containing at least one vanadium carbide, preferably vanadium tungsten carbide (VWC) hard facing grain, is incorporated together with a flux or fluxing composition containing nickel boron (NiB) or calcium silicon (CaSi) in a conventional hard facing rod. The hard facing rod may be of the ususal type used for hard facing iron and iron base alloy metal substrates, e.g., mild steel, Hadfield steels and the like. Such a hard facing rod comprises a metallic sheath made from the usual metals for such purposes such as iron, steel, aluminum, copper, and the like. The hard facing material and flux are thoroughly mixed together along with any other conventional ingredients that may be used, e.g., binders, etc., to provide a filler and the filler is then packed tightly inside the rod.

The flux or fluxing composition according to the present invention is employed in relatively small amounts in the filler mixture and may vary depending on the particular application. Nickel boron (NiB) when used as the flux or fluxing composition should be employed in amounts ranging from about 1 to 3% by weight of the total mixture, preferably about 2% by weight. Calcium silicon (CaSi), on the other hand, should be employed in smaller amounts ranging from about 0.1 to 0.5% by weight and preferably about 0.25% by weight of the total mixture. In instances where gas welding techniques (oxyacetylene) are used, the CaSi should be employed in small amounts of about 0.125% by weight while, on the other hand, larger amounts up to ½% by weight of CaSi may be used for electric welding deposits.

Although the flux or fluxing composition of the present invention may be composed entirely of either nickel boron or calcium silicon, it is preferred to employ NiB in the filler mixture alone or in combination with CaSi in appropriate amounts as indicated. Other conventional flux material may be used together in admixture with NiB and/or CaSi such as, for example, high carbon ferrochrome (HCFeCr), boron trioxide ($B_2O_3$) and Borax.

It has been found particularly advantageous to employ chromium carbide ($Cr_3C_2$) as a flux together with nickel boron or calcium silicon in the filler mixture in amounts of up to about 7% by weight, although $Cr_3C_2$ is often conventionally employed in far greater amounts, e.g., 50% by weight, as a major constituent of the hard facing material itself.

Generally, the NiB and CaSi are employed in the hard facing filler in granular form of a size of approximately 60 mesh×down.

It has been found that both NiB and CaSi are effective flux or fluxing components due to the fact that they readily wet vanadium carbides. A great number of other materials have been tried for this purpose but have failed for one reason or another, e.g., lack of adequate wetting or fluidity. Among these materials may be mentioned the following: $CaCO_3$, $K_2SiF_6$, NaF, $NaHSO_3$, NaCl and SiTi.

To prepare the filler material for use in a tubular welding rod, the hard facing material, e.g., VWC grain and flux containing NiB or CaSi are first thoroughly mixed together in the appropriate amounts as indicated above. The mixture is then wet with sodium silicate or a 25% glucose solution to bond the fine flux to the granular particulate surface. The mixture is then dried at elevated temperature, e.g., 100° C. The dried flux is then processed to weld rods by conventional practice.

The preferred hard facing material for use in the present invention are the vanadium tungsten carbide (VWC) solid solution granular materials described hereinabove and of which the following are typical examples:

96(0.75VC, 0.25WC) 2Ni, 2Mo
50(0.75VC, 0.25WC) 25$Cr_3C_2$, 25Fe

The following examples further illustrate the practice of the present invention.

EXAMPLE I

The following materials were used to obtain a cold pressed, sintered hard-facing composition containing about 56% by weight V, 22.25% by weight W, 2.2% by weight Mo, 2.2% by weight Ni, 13.5% C.

(a) 521.5 lbs. of a commercially available material (Union Carbide Corporation) containing mixed $V_2C$+VC, sized 65 mesh and finer having the following analysis:
85.42%: V
13.02%: C
0.75%: O
Balance moisture and incidental impurities.

(b) 40.5 lbs. Acheson* brand G39 graphite powder, sized 200 mesh and finer.
*Trademark of Union Carbide Corporation (c) 15 lbs. of nickel powder, extra fine grade from INCO.

(d) 169 lbs. of UCAR* tungsten metal powder (2.2 micron).
*Trademark of Union Carbide Corporation (e) 15 lbs. of molybdenum metal powder sized 4 micron.

The powders were placed in a water-cooled 37 in. dia. by 48 inch steel ball mill with 4470 lbs. of 3/4 in. dia. steel balls and turned at 28 RPM for 12 hours. After 12 hours milling, the material was cold pressed in a roll compactor and the cold pressed material was crushed into granules sized 30 to 80 mesh. The granules were placed in graphite boats and sintered in vacuum of 100 microns at 1400° C. for forty hours. After sintering the granules were lightly bonded together but were easily separated in a jaw crusher. The resulting material was formed of granules containing grains of chemically combined vanadium, tungsten, molybdenum and carbon; the grains were bonded to each other by a predominantly nickel-molybdenum alloy. The material had the following analysis by weight:
V: 56.10%
W: 22.26%
Mo: 2.22%
Fe: 1.62%
Ni: 2.24%
C: 13.48%
O: 0.02%
N: 0.10%

The cold pressed and sintered material as prepared above was sized to about 30×80 mesh and was employed as a hard facing material together with various fluxed including nickel boron, calcium silicon, high carbon ferrochrome and ferro boron. Test rods containing the hard facing grain and fluxes were prepared as described below and the welds were made in all cases using an oxyacetylene flame.

The test rods used in the experiment were one inch pieces of 5/16 inch OD mild steel tubing. 3.0 g of the hard facing grain and appropriate amounts of flux component were weighed out and placed in a jar. The flux was bonded to the grain surface to prevent segregation by wetting the mix with a 50% sugar solution except in the case of the flux (Flux No. 1) containing $Na_2O$ which was wet with 2 drops of Carbital. One end of the steel tube was crimped before adding the mix. After a suitable period for drying, the mix was packed inside the tube to fill the same and then crimped at the other end.

Various flux compositions were used in the test as follows:
Flux No. 1: 2%CaSi(0.06 g)+2%NiB(0.06 g)+1% $B_2O_3$ (0.3 g)+½% $Na_2O$(0.015 g)
Flux No. 2: 2%CaSi(0.06 g)
Flux No. 3: 2%NiB(0.06 g)
Flux No. 4: 2%CaSi(0.06 g)+2%HCFeCr(0.06 g)
Flux No. 5: 2%NiB(0.06 g)+2%HCFeCr(0.06 g)
Flux No. 6: 2%CaSi(0.06 g)+2%NiB(0.06 g)+2HCFeCr(0.06 g)
Flux No. 7: 4%HCFeCr(0.12 g)
Flux No. 8: 2%FeB(0.09 g)+3%HCFeCr(0.09 g)

The test welds were made by holding the rods down against a mild steel plate and applying a carbonizing oxyacetylene flame thereto. Flow and wetting characteristics of the particular granules and flux employed in each test rod were visually observed and recorded. The test results are given in the following table:

TABLE A

Flow and Wetting Characteristics of 96%(0.75VC, 0.25WC) 2%Ni, 2%Mo Hard Facing Granules Using Various Fluxes.

| Flux Composition | Visual Observation |
| --- | --- |
| Flux No. 1 | Fair to poor flow and wettability |
| Flux No. 2 | Viscous, required a lot of heat |
| Flux No. 3 | Fair flow and wettability, required a lot of heat |
| Flux No. 4 | Fair to poor flow and wettability, required a lot of heat |
| Flux No. 5 | Good flow and wettability |
| Flux No. 6 | Viscous - Flux No. 5 considerably |

TABLE A-continued

Flow and Wetting Characteristics of 96%(0.75VC, 0.25WC) 2%Ni, 2%Mo Hard Facing Granules Using Various Fluxes.

| Flux Composition | Visual Observation |
|---|---|
| | better |
| Flux No. 7 | Fair flow and wettability, eruption at end of weld |
| Flux No. 8 | Poor flow and wettability |

It will be readily seen that in this experiment using a hard facing material containing 96%(0.75VC, 0.25WC)+2%Ni, 2%Mo, fluxes containing nickel boron and calcium silicon performed significantly better than fluxes containing high carbon ferrochrome or ferro boron.

EXAMPLE II

The following materials were used to obtain a cold pressed, sintered hard facing composition containing 50% by weight of 0.75VC, 0.25WC, 25% by weight $Cr_3C_2$ and 25% by weight Fe for use in making a number of hard facing weld samples.

(a) 91.25 lbs. of a commercially available material (Union Carbide Corporation) containing mixed $V_2C+VC$, sized 65 mesh and finer having the following analysis:
85.85%: V
13.18%: C
0.92%: O
Balance moisture and incidental impurities.

(b) 13.07 lbs. Acheson* brand G39 graphite powder, sized 200 mesh and finer.
*Trademark of Union Carbide Corporation (c) 29.75 lbs. of UCAR* tungsten metal powder (2 micron).
*Trademark of Union Carbide Corporation (d) 37.25 lbs. of chromium metal powder sized 100×D.

(e) 56.25 lbs. of iron powder sized 325 mesh and finer.

The powders were placed in a 9 cubic foot ball mill with 1500 lbs. of ¾ inch diameter steel balls and turned at 34 RPM for 24 hrs. After milling, the powders were pressed in a 2 inch diameter die at 50 ton load. The pellets were crushed into granules sized 30×60 mesh and sintered in a vacuum furnace at 1250° C. for 4 hrs. The material was formed of chemically combined vanadium, chromium, tungsten, iron and carbon.

The cold pressed and sintered material prepared as described above was sized to about 30 by 80 mesh and was mixed with various types of fluxes in appropriate proportions in the same manner as described in the previous Example I. The fluxes were the same group of flux compositions (i.e., Flux No. 1 through Flux No. 8 in Example I) and the mixes were compacted into the same mild steel tubing and crimped at both ends. The rods so prepared were then employed in making test welds in the same manner and the same visual observations of flow and wettability were made. The results are given in the following table.

TABLE B

Flow and Wetting Characteristics of 50%(0.75 VC, 0.25WC) - 25%$Cr_3C_2$ + 25%Fe Using Various Fluxes

| Flux Composition | Visual Observation |
|---|---|
| Flux No. 1 | Good flow and wettability. |
| Flux No. 2 | Viscous. |
| Flux No. 3 | Wet well, little viscous. |
| Flux No. 4 | Wets good, viscous. |
| Flux No. 5 | Good flow and wettability. |
| Flux No. 6 | Not as good as Flux No. 5. |
| Flux No. 7 | Poor fluidity. |
| Flux No. 8 | Fluidity good, wet substrate poorly. |

It will be readily seen that in this experiment using a hard facing material containing 50%(0.75VC, 0.25WC) 25%$Cr_3C_2$+25%Fe, flux compositions containing nickel boron or calcium silicon performed significantly better than fluxes containing ferro boron or high carbon ferrochrome.

EXAMPLE III

The following materials were used to obtain a cold pressed, sintered hard facing composition containing 50% by weight VC, 25% by weight $Cr_3C_2$, 25% by weight Fe and 1% by weight excess carbon for use in making a number of hard facing weld samples.

(a) 120.0 lbs. of a commercially available material (Union Carbide Corporation) containing mixed $V_2C+VC$, sized 65 mesh and finer having the following analysis:
85.85%: V
13.18%: C
0.92%: O (b) 14.96 lbs. Acheson* brand G39 graphite powder, sized 200 mesh and finer.
*Trademark of Union Carbide Corporation (c) 36.75 lbs. of chromium metal powder, sized 65 mesh and finer.

(d) 56.25 lbs. of iron powder, sized 325 mesh and finer.

The powders were again milled and pressed into pellets of about 2 inch diameter and then crushed into granules using the same equipment and under the same conditions as described in the previous Example II. The granules were then sintered in the same furnace under the same conditions and then cooled to room temperature. The above process produced a hard facing material containing chemically combined chromium, vanadium, iron and carbon.

The cold pressed and sintered material as prepared above was sized to about 30 by 80 mesh and was mixed with various types of fluxes in appropriate proportions in the same manner as described in the previous Example I. The fluxes were the same group of flux compositions, (i.e., Flux No. 1 through Flux No. 8 in Example I) and the mixes were compacted into the same mild steel tubing and crimped at both ends. The rods so prepared were then employed in making test welds in the same manner and the same visual observation of flow and wettability were made. The results are given in the following table.

TABLE C

Flow and Wetting Characteristics of 75%VC, 25%$Cr_3C_2$, 25%Fe and 1% Carbon

| Flux Composition | Visual Observation |
|---|---|
| Flux No. 1 | Poor flow, poor wettability. |
| Flux No. 2 | Very viscous. |
| Flux No. 3 | Fair flow and wettability, required a lot of heat. |
| Flux No. 4 | Very viscous. |

TABLE C-continued

Flow and Wetting Characteristics of
75%VC, 25%Cr₃C₂, 25%Fe and 1% Carbon

| Flux Composition | Visual Observation |
| --- | --- |
| Flux No. 5 | Fair flow and wettability, required a lot of heat. |
| Flux No. 6 | Flow and wettability better than Flux Nos. 4 and 5, still required a lot of heat. |
| Flux No. 7 | Best flow and wettability in this test, required a lot of heat. |
| Flux No. 8 | Viscous. |

It will be readily seen that in this experiment using a hard facing material containing 50%VC, 25%Cr₃C₂, 25%Fe and 1% excess carbon, fluxes containing nickel boron and calcium silicon performed significantly better than fluxes containing ferro boron and probably almost as well as the fluxes containing high carbon ferrochrome.

I claim:

1. In a method for hard facing a surface of an iron or iron base alloy substrate by providing molten iron or iron base alloy on a portion of said surface and applying to the molten metal a hard facing material containing vanadium carbide and a flux therefor, the improvement which comprises employing as the flux a composition containing nickel boron or calcium silicon.

2. A method according to claim 1 in which the hard facing material comprises solid granules consisting essentially of vanadium carbide having from about 10 to 50% by weight tungsten in solid solution.

3. A method according to claim 2 in which the solid granules contain from about 1 to 4% by weight molybdenum in solid solution with said vanadium carbide and tungsten and from about 1 to 4% by weight of a nickel-molybdenum alloy as a binder metal.

4. A method according to claim 1 in which nickel boron is used as a flux composition in admixture with the hard facing material in amounts ranging from about 1 to 3% by weight of the total mixture.

5. A method according to claim 1 in which calcium silicon is used as a flux composition in admixture with the hard facing material in amounts ranging from about 0.1 to 0.5% by weight of the total mixture.

6. A method according to claim 5 in which the molten metal is provided by heating the substrate to its melting point using gas welding procedures and in which the calcium silicon is used in an amount of about 0.125% by weight of the total mixture.

7. A method according to claim 5 in which the molten metal is provided by heating the substrate to its melting point using electric welding procedures and in which the calcium silicon is used in an amount of about 0.5% by weight of the total mixture.

8. A method according to claim 1 in which the nickel boron or calcium silicon or mixtures thereof are employed in combination with other flux materials selected from the group consisting of high carbon ferrochrome, boron trioxide, Borax and chromium carbide.

9. A hard facing rod comprising a metal tubular sheath having disposed therein a mixture of a hard facing material containing vanadium carbide and a flux composition containing nickel boron or calcium silicon.

10. A hard facing rod according to claim 9 in which the hard facing material comprises solid granules consisting essentially of vanadium carbide having from about 10 to 50% by weight tungsten in solid solution.

11. A hard facing rod according to claim 10 in which the solid granules contain from about 1 to 4% by weight molybdenum in solid solution with said vanadium carbide and tungsten and from about 1 to 4% by weight of a nickel-molybdenum alloy as a binder metal.

12. A hard facing rod according to claim 9 in which nickel boron is used as a flux composition in admixture with the hard facing material in amounts ranging from about 1 to 3% by weight of the total mixture.

13. A hard facing rod according to claim 9 in which calcium silicon is used as a flux composition in admixture with the hard facing material in amounts ranging from about 0.1 to 0.5% by weight of the total mixture.

14. A hard facing rod according to claim 9 in which the nickel boron or calcium silicon or mixtures thereof are employed in combination with other flux materials selected from the group consisting of high carbon ferrochrome, boron trioxide, Borax and chromium carbide.

* * * * *

UNITED STATES PATENT AND TRADEMARK OFFICE
CERTIFICATE OF CORRECTION

PATENT NO. : 4,451,508
DATED : May 29, 1984
INVENTOR(S) : Harry J. Brown

It is certified that error appears in the above-identified patent and that said Letters Patent is hereby corrected as shown below:

Column 4, line 18, "N:0.10%" should be -- N:$<$0.10%-- line 22, "fluxed" should be -- fluxes --

Signed and Sealed this

Fourth Day of December 1984

[SEAL]

Attest:

GERALD J. MOSSINGHOFF

*Attesting Officer*  *Commissioner of Patents and Trademarks*